May 20, 1969     R. E. BRAUKHOFF     3,444,966
DISK BRAKE WITH BUTTON-TYPE SHOES AND AIR COOLING
Filed July 14, 1967     Sheet 1 of 6
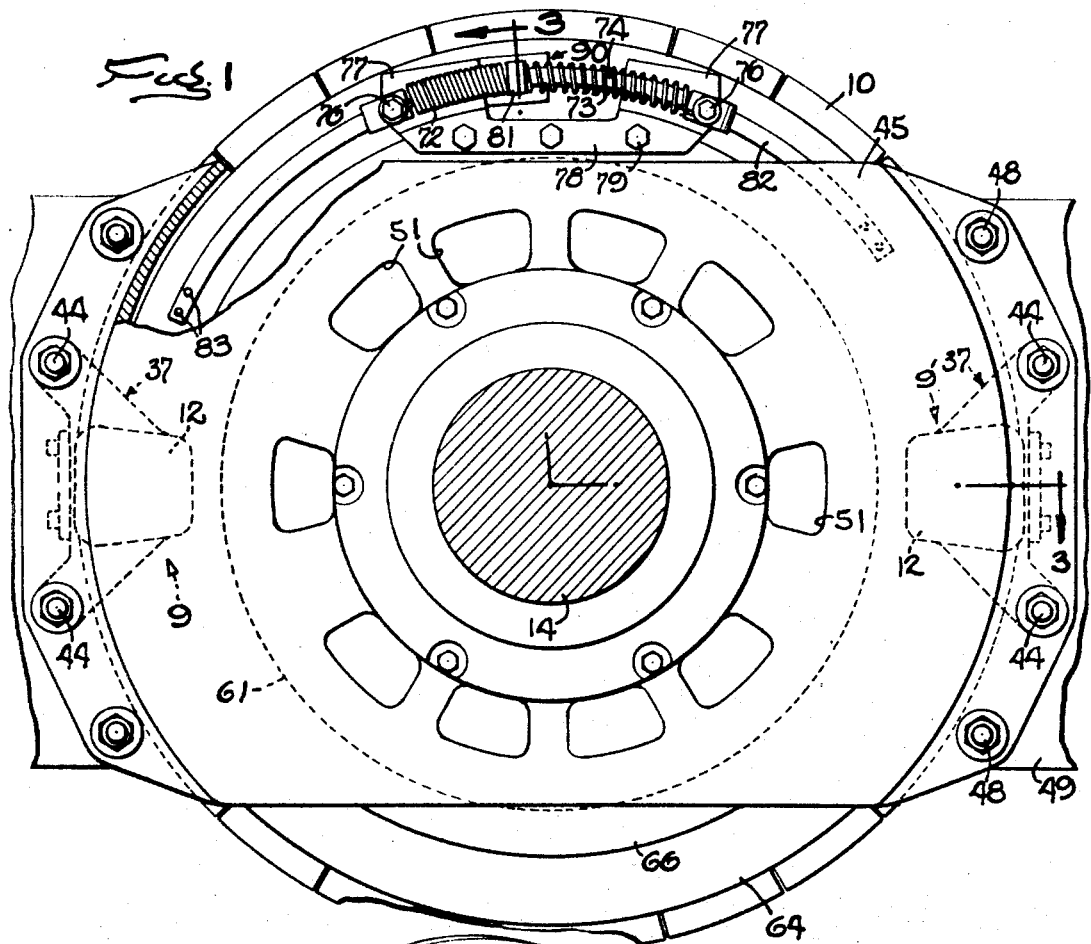
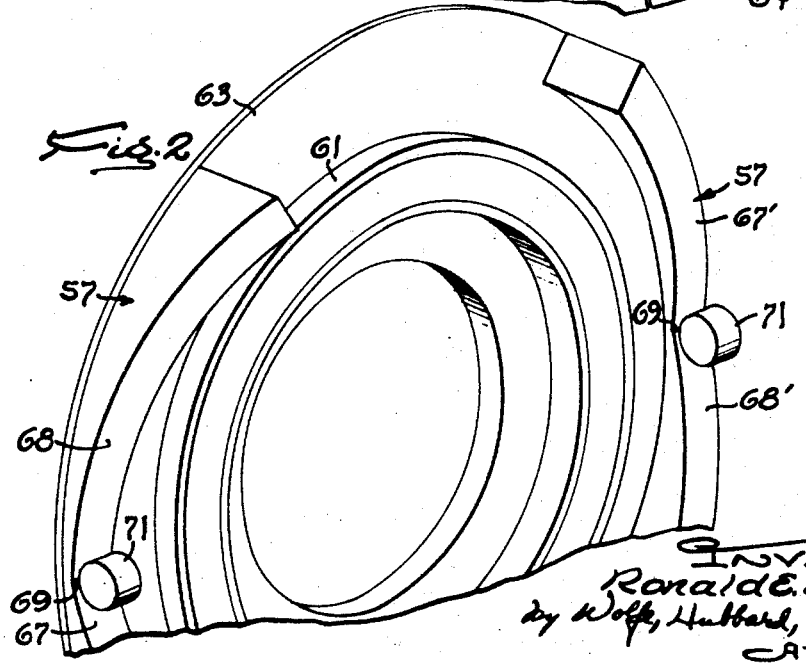

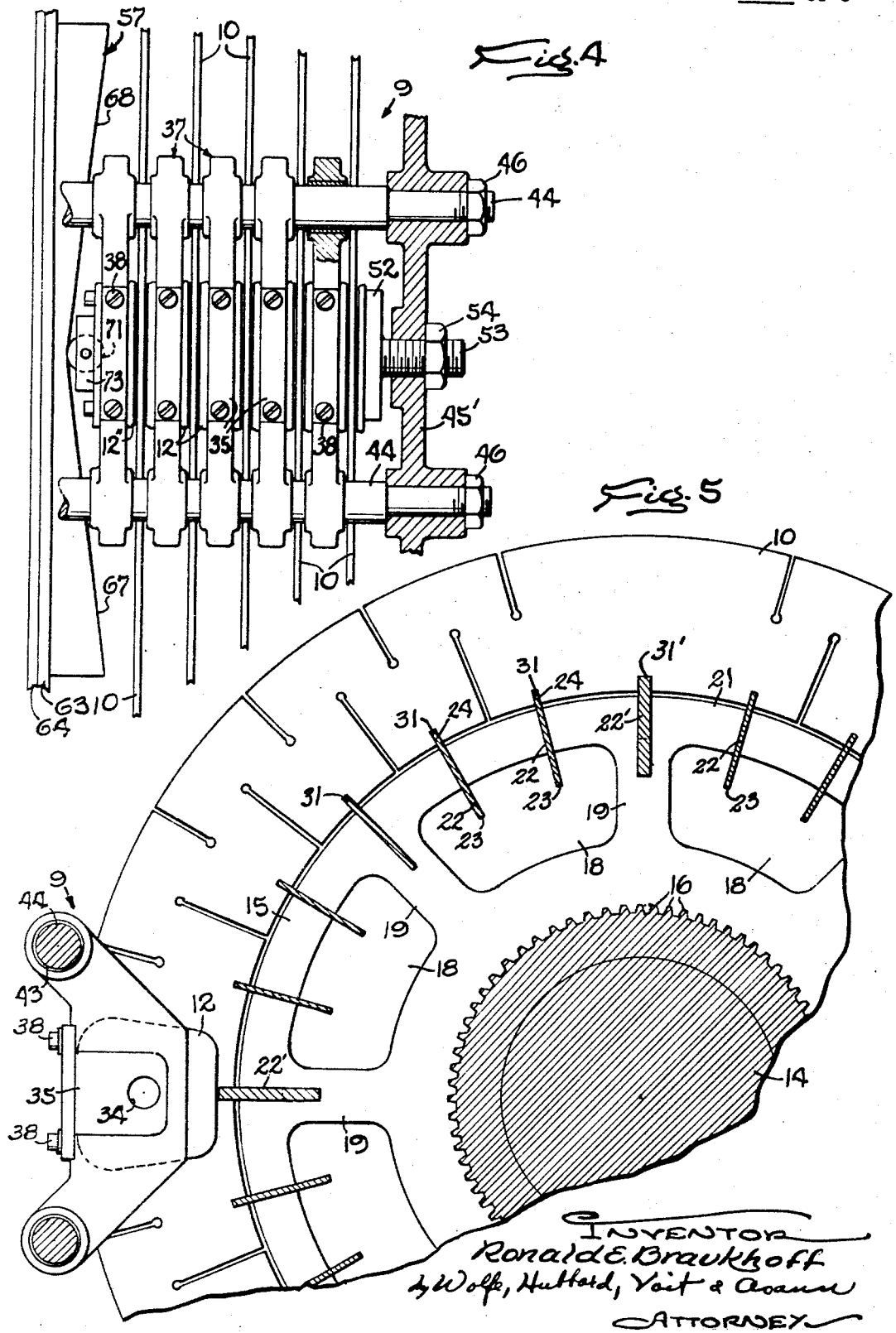

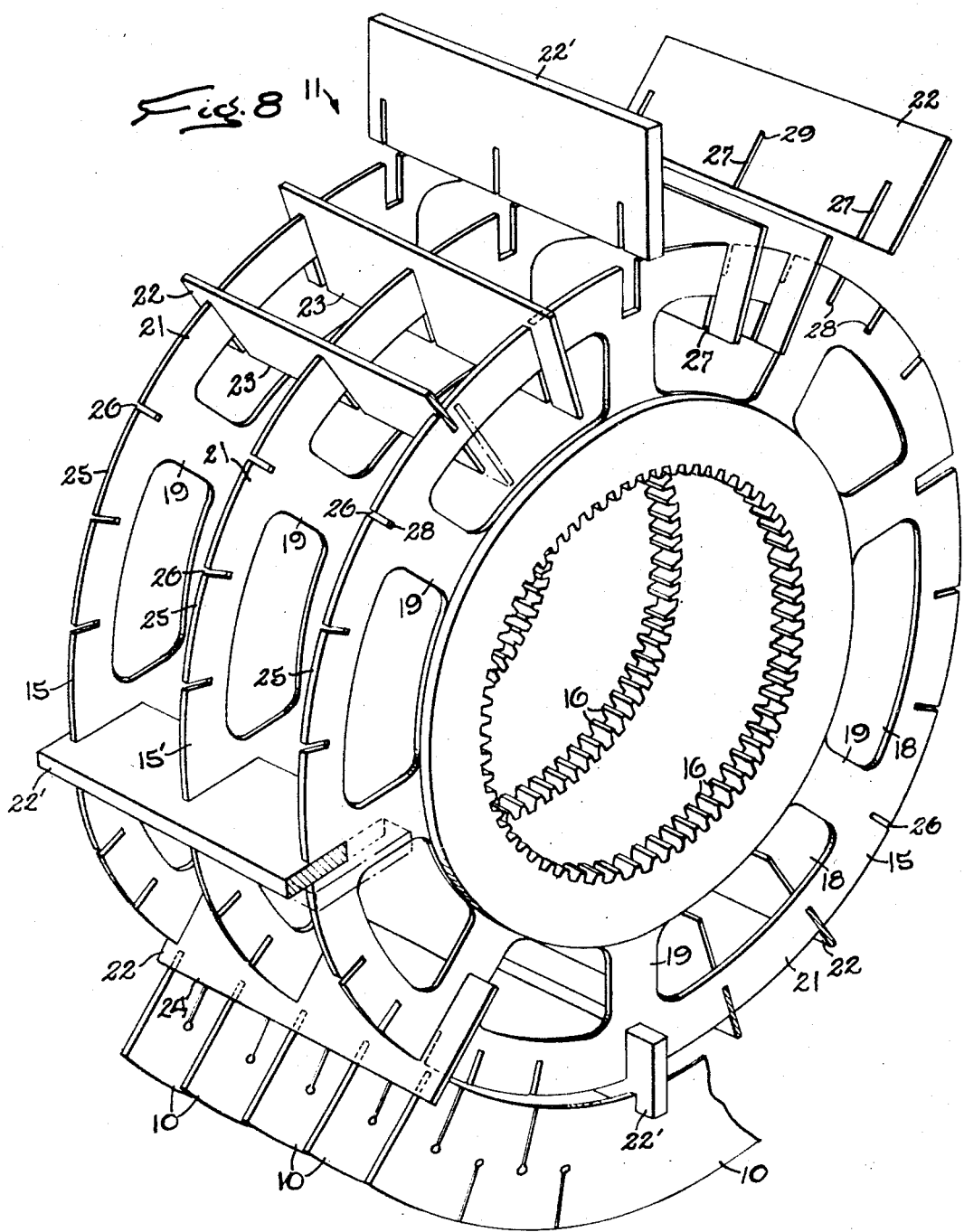

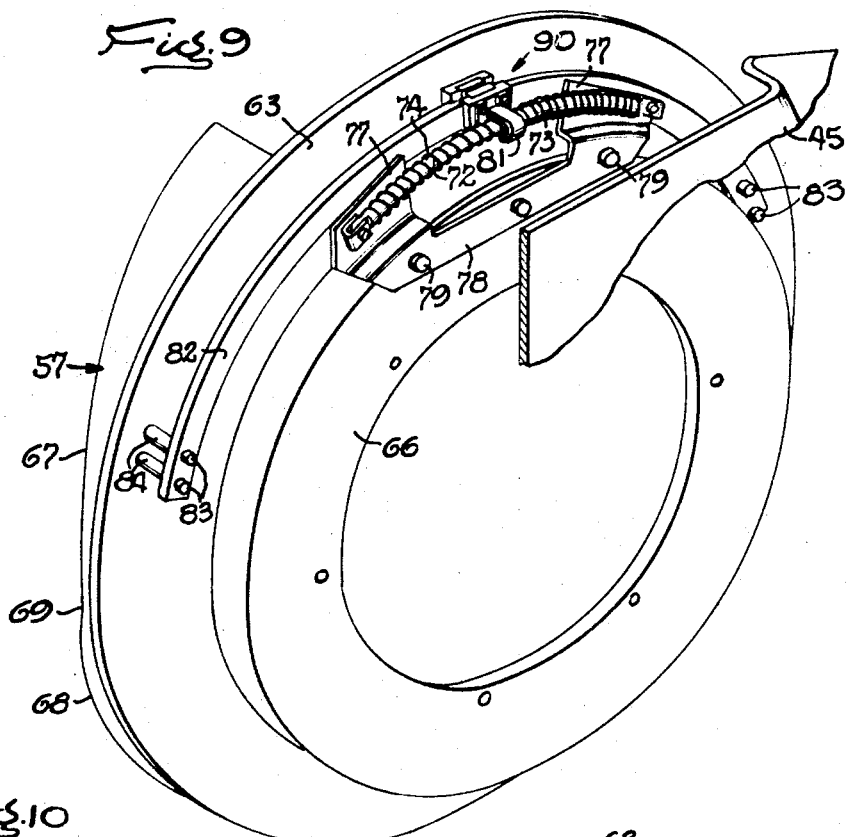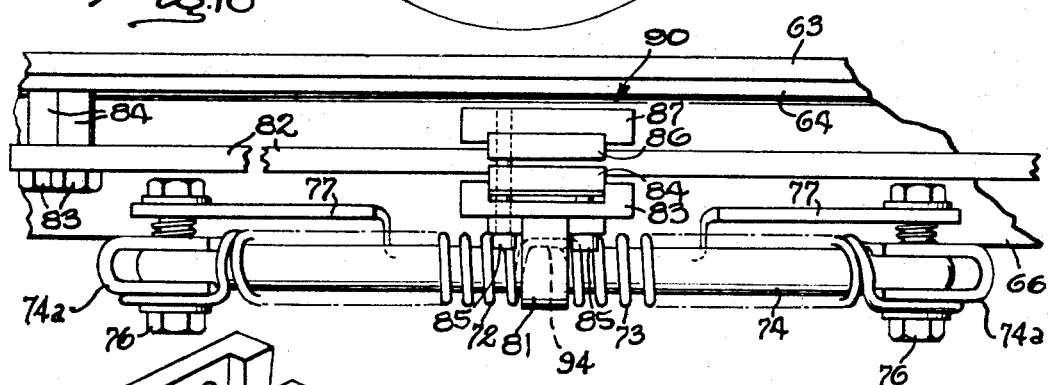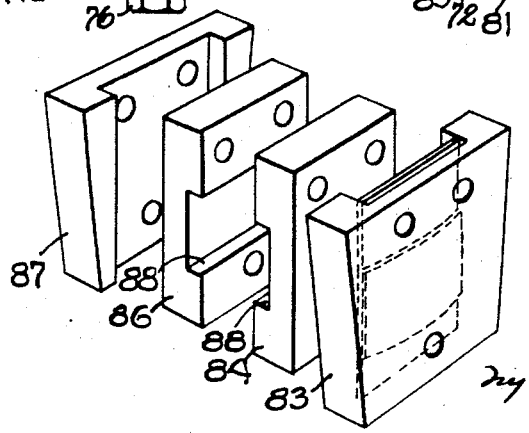

United States Patent Office 3,444,966
Patented May 20, 1969

3,444,966
DISK BRAKE WITH BUTTON-TYPE SHOES
AND AIR COOLING
Ronald E. Braukhoff, Beloit, Wis., assignor to Warner
Electric Brake & Clutch Company, South Beloit, Ill.,
a corporation of Delaware
Filed July 14, 1967, Ser. No. 653,410
Int. Cl. F16d 65/78, 55/00, 13/60
U.S. Cl. 188—264                                    6 Claims

ABSTRACT OF THE DISCLOSURE

A plurality of thin axially spaced friction rings are splined onto radially disposed and angularly spaced fan vanes spanning apertured end disks fixed on a drive shaft thus forming a squirrel cage fan. Pairs of friction buttons engageable with opposite sides of each ring float axially on two part stationary supports between the backs of adjacent buttons. A power actuator is energized to compress the buttons and rings together axially and thus develop a retarding torque applied to the shaft.

BACKGROUND OF THE INVENTION

This invention relates to brakes of the type in which the retarding torque is derived by pressing button-like shoes of high temperature friction material against opposite sides of a disk rotating with a vehicle wheel or other part to be retarded. The invention is concerned more particularly with the cooling of such a brake by forcing air to flow outwardly across opposite sides of the disks.

SUMMARY OF THE INVENTION

The primary object is to provide a disk brake of the above character which, as compared to prior constructions, permits the use of thin disks of narrower radial width with more rugged mounting and more effective cooling irrespective of the diameter of the disk area engaged by the friction shoes. The cooling is accomplished by splining the brake disks onto the outer edges of radially disposed and angularly spaced vanes spanning the outer peripheries of apertured and axially spaced driving disks and cooperating with the vanes to form a squirrel cage fan. Two buttons of rigid high temperature friction material are disposed on opposite sides of each brake disk and mounted for axial floating on and easy removal from stationary supports disposed between the backs of the adjacent buttons.

BRIEF DESCRIPTION OF THE DRAWINGS

FIGURE 1 is an end view, on substantially one-third scale, of a multiple disk brake embodying the novel features of the present invention.

FIG. 2 is a fragmentary perspective view of part of the brake actuator.

FIG. 4 is an end view taken from the left of FIG. 1 with certain of the parts broken away.

FIG. 5 is a fragmentary section taken along the line 5—5 of FIG. 3.

FIG. 8 is a partially exploded perspective view of the fan cage.

FIG. 9 is a fragmentary perspective view of part of the wear adjuster.

FIG. 10 is a fragmentary plan view of the mechanism shown in FIG. 9.

FIG. 11 is an exploded perspective view of certain of the parts shown in FIG. 9.

DESCRIPTION OF THE PREFERRED EMBODIMENT

Figure 3:
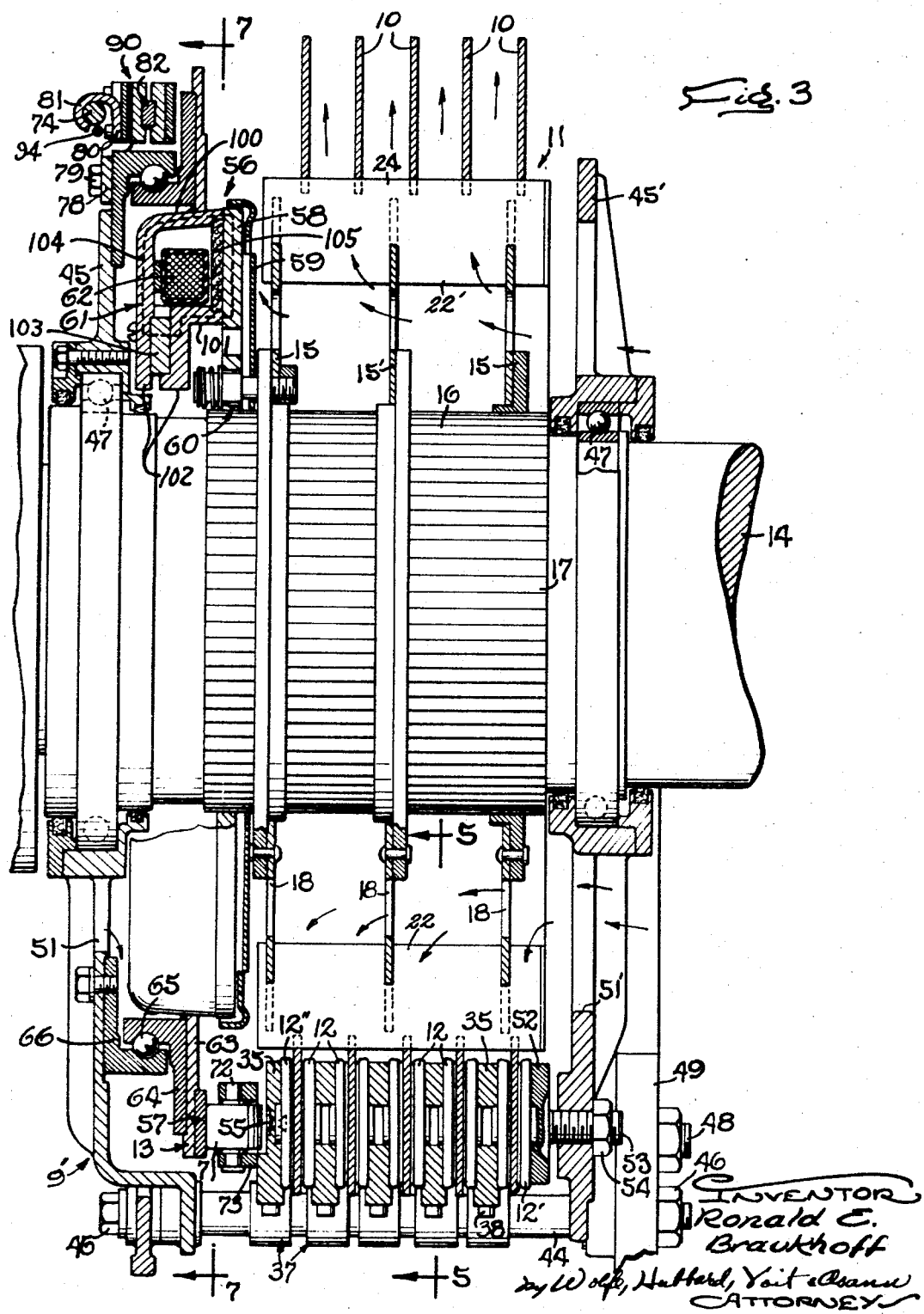
FIG. 3 is a section taken along the line 3—3 of FIG. 1.

In the improved friction brake shown in the drawings, two multiple disk and shoe assemblies 9 and 9' are disposed on diametrically opposite sides of a shaft 14 to which a powerful retarding torque is exerted when the brakes are engaged. Each assembly comprises generally a plurality of thin disks 10 of relatively narrow radial width axially spaced along and splined to the outer periphery of a rotary squirrel cage fan 11 and alined button-type friction elements or shoes 12, two for each disk, stationarily mounted for individual axial floating and pressed into gripping engagement with opposite sides of the disks by a suitable power actuator 13 thus deriving a powerful torque transmitted through the cage to a supporting shaft 14.

The cage 11, which may be a single piece casting, includes end disks 15 axially spaced apart along the shaft and in this instance an intermediate similar disk 15'. The disks may be secured to the shaft as by welding but herein are splined thereon through the meshing of teeth 16 formed around the interior of the disks and on a collar 17 fixed to the shaft. To permit of the free flow of air axially into the cage, angularly spaced apertures 18 are formed in the intermediate disk 15' and at least one of the terminal disks 15, all three disks being formed with such apertures in the present instance. Preferably, these openings occupy the major portion of the disk area leaving spokes 19 between the adjacent holes 18 and a continuous outer rim 21.

Preferably, the vanes of the fan comprise flat rectangular plates 22 disposed in radial planes, herein about fifteen degrees apart, and spanning and secured rigidly to the rims 21 of the disks with their inner edge portions 23 projecting across about one-third of the width of the disk holes 18 as shown in FIGS. 5 and 8. For an important purpose to appear presently, narrow portions 24 of the outer edges of the vanes project beyond the peripheries 25 of the disks.

While the vanes 22 may be joined to the disks 15, 15' by welding or cast integral therewith, they are, for most economical manufacture and assembly, preferably formed as shown as separate sheet metal stampings and notched for secure interlocking and driving relation with the disks. Thus, and as best shown in FIG. 8, each vane is long and thin enough for edgewise insertion into squared notches 26 formed in the rims 21 and radially disposed and outwardly opening. Squared notches 27 formed in the inner edge portions of the vanes are spaced to receive closely the disks 15, 15'. When the bottoms 28, 29 of the notches come into abutment as shown in FIG. 8, the vanes will be connected securely to the disks thus joining the two into a rigid unit and forming a squirrel cage type fan. Usually the vanes are tack welded to the disks 15. In the present instance, some of the vanes, indicated at 22', are made of increased thickness to increase the strength of the driving engagement with the brake discs 10.

The brake disks are composed of medium carbon low alloy steel about .125 of an inch thick and of a width somewhat greater than the dimension of the friction buttons 12 which lies along the radius of the disk. To minimize thermal warping during application of the brake, the disks 10 are formed with narrow inwardly and outwardly opening radial slots 20 which alternate with each other, overlap somewhat at the closed ends and are quite closely spaced around the disk. The latter is thus divided into relatively short and independently flexible segments. The inner edge portions of the disks project beyond the inner edges of the buttons and are spline coupled to the outer edges of the vanes 15, 15'. For this purpose, radially disposed square notches 31' are formed around the inner periphery of each disk and spaced and sized to receive and fit closely the outer edge portions of the vanes 22' as disks are moved axially onto the cage. Squared notches 31 are formed around the inner periphery of each disk and spaced and sized to provide clearance for the vanes 22 which are sufficient in number to produce the most efficient outward flow of air through the cage.

Figure 6:
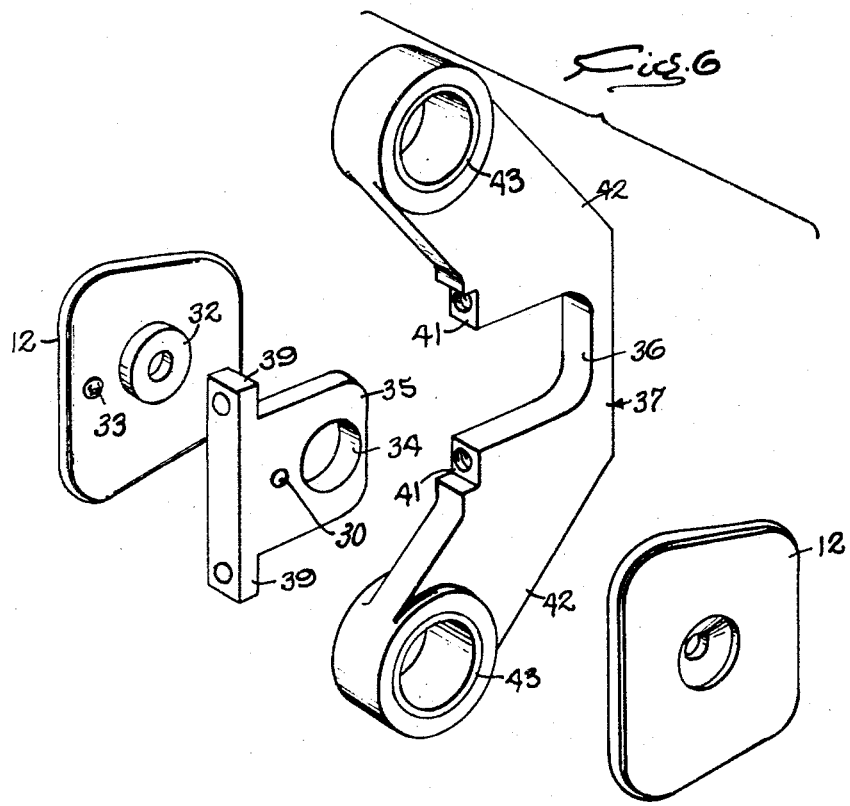
FIG. 6 is an exploded perspective view of the brake shoes and their mounting.
Figure 7:
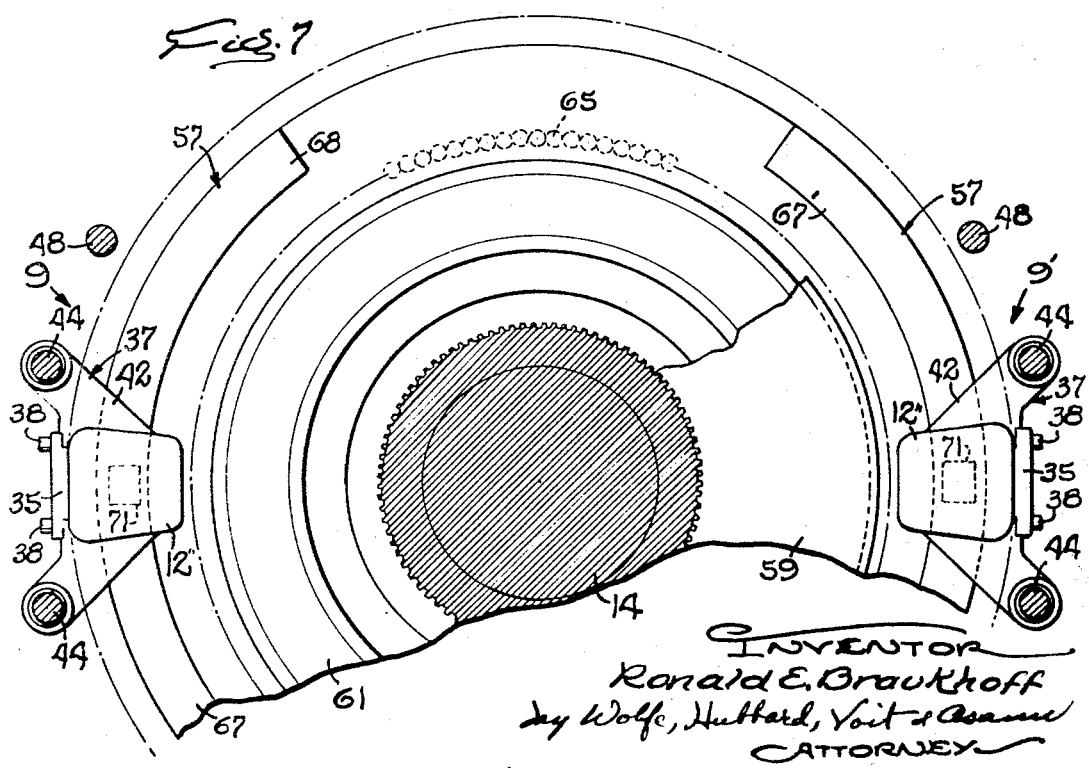
FIG. 7 is a fragmentary section taken along the line 7—7 of FIG. 3.

The shoes 12 of each of the assemblies 9 and 9' are friction material capable of operating at temperatures higher than 800 deg. F. In this case, they comprise a flat button enclosed in a shell having a short cylindrical boss 32 (FIG. 6) projecting axially from the back thereof and a small lug 33 offset radially from the boss. There are two shoes for each disk 10 mounted on opposite sides of the disk for axial floating and for engagement of their parallel flat faces with opposite sides of the disk. For this purpose, the oppositely projecting bosses of adjacent buttons are telescoped into a hole 34 in a spacer in the form of a flat block 35 which is disposed between adjacent buttons and forms a backing therefor, the ends of the bosses of such buttons being spaced apart within the hole as shown in FIG. 3. Each button is held against turning relative to its supporting block by the projection of its lug 33 into a hole 30 offset from the hole 34.

Each of the spacer blocks 35 is clamped in a crossbar 37 of shallow V-shape and adapted for removal. To permit of convenient replacement of the button of each pair after wearing in service use, each of the spacer blocks is centered and seated solidly in a complemental recess 36 in a bar 37 somewhat thinner than the blocks and V-shaped with opposite end portions 42 diverging radially and outwardly and projecting beyond the peripheries of the brake disks 10. The block is secured to the bar by screws 38 threading into the block and extending through holes in oppositely projecting lugs 39 on the block seated in squared notches 41 in the bar. The heads of the clamping screws project outwardly and are thus exposed for release to permit easy removal of the block and the two button supported thereby.

Beyond the outer edges of the disks 10, the ends of the bars are apertured to receive bearing bushings 43 which are telescoped onto rods 44 that span stationary frame plates 45, 45' disposed beyond opposite ends of the disk and shoe assembly 9. Nuts 46 threaded onto the outer ends of the rods clamp the plates against shoulders on the rods 44. Herein, the plates are apertured at the center, supported from the shaft 14 through bearings 47, and secured by bolts 48 (FIG. 1) to the frame 49 that supports the shaft 14. Holes 51 and 51' angularly spaced around the plates near the shaft admit air to the holes 18 at the ends of the fan cage as shown by the arrows in FIG. 3.

The buttons 12 thus mounted and stacked together with the disks 10 form the compact assembly 9 which is adapted to float axially as a unit along the supporting rods 44 to accommodate wearing of the disks and the buttons in service use. The terminal button 12' of this assembly abuts against a backing disk 52 (FIG. 3) which is recessed to receive the bosses 32 of such button and is fixed to the end of a screw 53 aligned with the axis of the buttons and threaded into the plate 51' to determine the axial position of the stack relative to the fan cage and its disks 15. A lock nut 54 fixes this position.

The opposite terminal button 12" is preferably secured as by a rivet 55 (FIG. 3) to the terminal one of the floating blocks 35 to which is applied the actuating force for compressing the assembly 9 axially to develop the desired retarding torque. While the actuator 13 for producing this force may take various forms, such for example as a hydraulic servo, it comprises in the illustrated embodiment an electromagnetically controlled friction clutch 56 adapted when activated to derive from the kinetic energy of the shaft 14 and the parts rotating therewith a friction torque which is converted through an inclined cam 57 into pressure exerted on the terminal button 12" along the axis of the button and disk assembly 9.

In the form shown, the clutch is of the fail safe construction shown in Patent No. 3,199,645 and includes an armature comprising an annular series of segments 58 welded to a backing plate 59 and splined into the shaft 14 for axial floating and including a device 60 for taking up wear on the segment faces automatically. The armature is drawn axially into gripping engagement with the friction face of a magnet core 61 herein comprising inner and outer rings 100, 101 (FIG. 3) of L-shaped cross-section terminating in pole faces which are separated by friction segments 105 and cooperate therewith to form the clutch face. Inner peripheral flanges 102 on the rings are clamped as by screws against opposite faces of flat segments 103 of permanent magnet material arranged end to end around the rings and cooperating therewith to define a toroidal path 104 threaded by the permanent magnet flux by which the clutch is activated. Secured to and within the magnet core is a multiple turn winding 62 which, when energized, neutralizes the permanent flux through the pole faces and effects release of the clutch which is again activated when the winding is deenergized.

An annular flange 63 (FIG. 3) projecting from the outer magnet pole is secured to a ring 64 of L-shaped cross-section journaled in bearings 65 supported by a ring 66 on the inner face of the assembly supporting plate 45. The cam 57 is secured to the flange 63 and comprises in the present instance an arcuate bar welded to and projecting axially from the ring 63 and having inclined surfaces 67, 68 (FIGS. 2 and 3) which converge circumferentially to a low point 69.

The follower for the cams is a roller 71 journaled on a pin 72 (FIG. 3) spanning the legs 73 of a yoke rigid with the block 35 carrying the terminal button 12" (FIG. 3). In the released position of the brake as initially adjusted, the roller 71 engages the cam at the low point 69 (FIG. 4). Upon turning of the magnet in either direction away from this position, a corresponding one of the cam surfaces becomes effective to wedge the follower roller away from the ring 63 and compress the shoe and disk assembly 9 against the terminal button 12' backed by the plate 51' thereby applying to the shaft 14 through the medium of the cage 11 a retarding torque which is proportional to the degree of deenergization of the winding 62. Similar action occurs when the winding is deenergized with shaft 14 rotating in the opposite direction, the other one of the inclined cam surfaces producing the compression of the assembly 9.

Upon energization of the magnet winding 62, the brake is released immediately by reverse movement of the magnet and cam under the action of return springs 72, 73. The latter may be constructed and mounted to act individually either in tension or in compression between the magnet and a shiftable stop 81. Or, as here, the springs act together during each brake application, one in compression and the other in tension. For this purpose, the springs 72, 73 comprise helical coils surrounding and supported by an arcuate rod 74 whose opposite ends are disposed in clips 74ᵃ (FIGS. 9 and 10) clamped by screws 76 against wings 77 on a plate 78 which is secured by screws 79 against the ring 66 fixed as above described to the frame plate 45. Adjacent ends of the springs are joined by an integral straight length or link 94 (FIGS. 3 and 10) and abut against opposite sides of the stop 81 which, in accordance with another aspect of the present invention, is supported by and coupled frictionally to an arcuate substantially semi-circular bar 82 fixed through screws 83 and spacers 84 to the flange 63 which is fixed to and oscillates with the magnet core 61.

In the present instance, the stop 81 is a strap of sheet metal curled around the rod 74 and coupled to the bar 82 through a friction device 90 which enables the brake-released position of the magnet and cam to be adjusted automatically for taking up wear on the disks 10 and shoes 12. For this purpose, an end portion 80 of the stop 81 is clamped to blocks 83, 84 (FIGS. 10 and 11) by screws 85. The latter extend through a block 86 and are threaded into a block 87. The blocks 84, 86 are preferably composed of friction material such as nylon and are formed with opposed arcuate and squared grooves 88 concentric with the magnet and cage axis and having a combined depth less than the thickness of the flat bar 82 disposed therein.

By tightening the screws 85, the friction coupling the spring abutment 81 to the bar 82 may be adjusted to a value such as to allow the bar, during a brake-applying movement of the magnet, to slide through the device 90 and past the stop 81 after one of the return springs has been compressed and the other correspondingly tensioned enough to effect proper release of the brake when the magnet is deenergized. Herein, the slipping starts in brake-actuating movement of the magnet when, by movement of the stop 81 with the bar 82 and magnet in one direction has compressed and substantially closed one of the coils and correspondingly stretched the other coil as shown in FIG. 1. Then, as the magnet continues on to take up any remaining wear produced clearance in the brake proper, the friction in the coupling 90 is overcome and the bar slides through the latter until the selected braking pressure has been developed by the wedging action of the active cam surface.

Now, when the magnet winding 62 is energized to release the brake, the stop 81 remains coupled to the bar 82 in its new position so that the bar and magnet are, by expansion of the compressed spring and contraction of the tensioned spring, returned to the normal position (FIG. 1) in which the forces of the two springs are dissipated. This return movement is of substantially fixed length so that, if prior to application of the brake, clearances had developed due to wearing of the shoes 12, the cam 57 and the magnet will be stopped short of their prior positions with the follower 71 engaging the cam up incline from the low point 69. Such automatic readjustment of the brake-released position of the cam due to slipping of the bar 82 through the friction coupling 80 is always proportional to the prevailing clearances with the brake assemblies 9 caused by previous energization of the brakes. Thus, as wear continues in successive applications of the brake with the shaft 14 turning in one direction, the low point 69 of the cam will be returned to positions spaced farther from the follower 71 so that in each succeeding energization of the brake, the cam will move through arcs of substantially equal lengths in each application of the brake.

The same automatic wear compensating action takes place during successive applications of the brake with the shaft 14 rotating in the opposite direction. Engagement of the disks 10 and shoes 12 is effected by the other of the two inclines on the cam 57. During the first of successive applications, the magnet and cam must move an additional distance equal to the prevailing spacing of the roller 71 from the low point 69 of the cam. Then, in succeeding brake applications, the cam movement is shortened and in each case corresponds to that required to take up normal clearances in the brakes plus the wear that occurred in the previous brake application.

By virtue of the efficient action of the fan in dissipating the heat generated in the disks 10, the retarding torque developed may be multiplied by utilizing the disks 10 above described as the driving elements of more than one disk and shoe assembly angularly spaced around the cage 11. Herein, the two assemblies 9 and 9' are disposed diametrically on the assembly 9 and are of identical construction and arranged to be activated respectively by similar cam surfaces 67, 68 and 67', 68' angularly spaced apart around the magnet ring 61 and acting on the follower 71 and 71' to compress the elements of the respective assemblies 9 and 9'. The return spring arrangement with the automatic wear compensation above described serves both of these brake assemblies.

It will be apparent that the improved brake as above described is of extremely rugged construction although composed of parts which are simple and inexpensive to construct and assemble. Contributing to these advantages as well as high efficiency of heat dissipation are the thin and relatively narrow brake disks 19 and the splining thereof onto the outer periphery of the highly efficient squirrel cage fan 11. The outwardly projecting edges of the vanes 22' constitute rigid bars that provide large areas of splined driving engagement with the brake disks 10. By virtue of the thinness of the disks 10 and the efficient scrubbing action by the large volume and rapid outward flow of air induced by the squirrel cage fan, it is possible to work the disks at substantially higher temperatures than has been possible heretofore thus achieving more rapid heat dissipation without objectionable warping of the disks and while permitting the disks to be used with a plurality of angularly spaced sets of brake shoes 12.

I claim:

1. In a disk-type friction brake, the combination of a rotary drive shaft, axially spaced circular end disks surrounding said shaft and rotatable therewith, a plurality of fan vanes disposed substantially in radial planes and angularly spaced around and spanning the peripheries of said disks, said vanes cooperating with the disks to form a generally cylindrical squirrel cage open at one end to admit air which is induced to flow outwardly by said vanes during rotation of the cage, a friction brake disk in the form of a thin and flat ring of relatively narrow width encircling said cage parallel to the cage disks, means coupling the inner periphery of the ring to the outer periphery of the cage for rotation therewith and for axial floating relative thereto, a stationary support adjacent said ring, and friction buttons mounted on said support outside of said cage for axial floating into and out of gripping engagement with opposite sides of said ring over a short arc thereof.

2. A disk-type friction brake as defined in claim 1 in which said brake disk is formed with inwardly opening radial notches corresponding in angular spacing to said vanes and the outer edges of said vanes project from at least one of said end disks and are disposed in the respective ones of said notches whereby to permit endwise splining of the disk onto said cage.

3. A disk brake as defined in claim 1 in which said vanes are interlocked with and secured to said end disks through the medium of outwardly opening radial notches angularly spaced around the end disks and receiving the inner edge portions of the vanes and the latter portions are formed with notches having walls that straddle said end disks below said notches therein.

4. In a disk-type friction brake, the combination of, a rotary drive shaft, axially spaced circular end disks surrounding said shaft and rotatable therewith, a plurality of fan vanes disposed substantially in radial planes and angularly spaced around and spanning the peripheries of said disks, said vanes cooperating with the disks to form a generally cylindrical squirrel cage open at one end to admit air which is induced to flow outwardly by said vanes during rotation of the cage, a plurality of thin and flat friction rings of relatively narrow radial width and larger than said cage encircling the cage parallel to the cage disks, means coupling the inner peripheries of said rings to the outer periphery of the cage for rotation therewith and for axial floating relative thereto, a stationary support adjacent said rings, a pair of rigid friction buttons arranged back to back between said friction rings and abutting each other at their adjacent ends, means on said support mounting said buttons for axial floating and gripping engagement with the opposed sides of the rings, and means for applying an actuating force axially of said buttons to compress the latter between and against the opposed sides of said friction rings.

5. A disk brake as defined in claim 4 including a block disposed between said buttons and seated in an outwardly opening recess in said support, said block having a hole extending therethrough in axial alinement with said buttons, bosses rigid with the adjacent ends of said buttons and projecting slidably into opposite ends of said hole and abutting each other within the hole whereby to support the two buttons for axial floating relative to said block, and means securing said block detachably to said support to permit of edgewise removal of the block and buttons from between said friction rings.

6. A disk brake as defined in claim 5 in which said block securing means includes a screw having an exposed head accessible from the exterior of said rings.

References Cited

UNITED STATES PATENTS

| | | |
|---|---|---|
| 2,246,214 | 6/1941 | McCune et al. |
| 2,263,945 | 11/1941 | Eksergian. |
| 2,550,111 | 4/1951 | Else. |
| 2,757,761 | 8/1956 | Milan. |
| 2,918,990 | 12/1959 | Davis _____ 188—73 |
| 3,005,522 | 10/1961 | Butler _____ 188—73 |
| 3,209,876 | 10/1965 | Kraft. |
| 3,233,704 | 2/1966 | Strain et al. |

FOREIGN PATENTS 714,374  7/1965  Canada.

GEORGE E. A. HALVOSA, *Primary Examiner.*

U.S. Cl. X.R.

188—73; 192—113